US009052192B2

(12) United States Patent
Hahm et al.

(10) Patent No.: US 9,052,192 B2
(45) Date of Patent: Jun. 9, 2015

(54) APPARATUS AND METHOD FOR RECOGNIZING ZONE IN PORTABLE TERMINAL USING EARTH MAGNETIC FIELD COMPONENTS AND IMAGES

(75) Inventors: Seong-Il Hahm, Yongin-si (KR); Seong-Ho Cho, Seoul (KR); Jin-Wook Lee, Yongin-si (KR); Hun-Je Yeon, Seoul (KR); Young-Ki Kim, Seoul (KR); Pil-Seob Kang, Suwon-si (KR); Shin-Il Kang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 797 days.

(21) Appl. No.: 13/117,442

(22) Filed: May 27, 2011

(65) Prior Publication Data

US 2011/0294517 A1    Dec. 1, 2011

(30) Foreign Application Priority Data

May 31, 2010  (KR) .................. 10-2010-0050847
Feb. 11, 2011 (KR) .................. 10-2011-0012486

(51) Int. Cl.
| | | |
|---|---|---|
| H04W 24/00 | (2009.01) | |
| H04M 3/00 | (2006.01) | |
| G01C 17/28 | (2006.01) | |
| G01C 21/20 | (2006.01) | |
| G01S 5/16 | (2006.01) | |
| G06F 1/16 | (2006.01) | |

(Continued)

(52) U.S. Cl.
CPC .............. *G01C 17/28* (2013.01); *G01C 21/206* (2013.01); *G01S 5/16* (2013.01); *G06F 1/16* (2013.01); *H04M 1/72572* (2013.01); *H04W 4/02* (2013.01); *G06F 1/1684* (2013.01); *G06F 1/1694* (2013.01)

(58) Field of Classification Search
CPC .... G06K 9/3241; G01C 17/28; G01C 21/206; G01S 5/16; H04W 4/02; H04W 4/026
USPC ................................ 382/103, 104, 217, 218; 455/456.1–456.6, 418–420, 550.1
See application file for complete search history.

(56) References Cited

U.S. PATENT DOCUMENTS

| | | | |
|---|---|---|---|
| 5,444,669 | A | 8/1995 | Polvani |
| 6,323,807 | B1 | 11/2001 | Golding et al. |

(Continued)

FOREIGN PATENT DOCUMENTS

| | | | |
|---|---|---|---|
| CN | 1651864 A | 8/2005 | |
| CN | 101556154 A | 10/2009 | |

(Continued)

OTHER PUBLICATIONS

International Search Report dated Dec. 23, 2011 in connection with International Patent Application No. PCT/KR2011/003967.

(Continued)

*Primary Examiner* — Brandon Miller (57) ABSTRACT

An apparatus and method for recognizing an indoor zone in which a user is located by using an Earth's magnetic field that is generated naturally instead of the conventional method of combining a magnetic field generator and a magnetic field sensor. The apparatus includes a zone evaluator configured to primarily recognize a location of the portable terminal by using first and second components of an Earth's magnetic field and to finally recognize the location of the portable terminal by using first and second images.

10 Claims, 8 Drawing Sheets

(51) Int. Cl.
*H04M 1/725* (2006.01)
*H04W 4/02* (2009.01)

(56) References Cited

U.S. PATENT DOCUMENTS

| | | | |
|---|---|---|---|
| 7,224,903 B2* | 5/2007 | Colmenarez et al. | 398/106 |
| 7,653,212 B2* | 1/2010 | Haughawout et al. | 382/100 |
| 8,385,591 B1* | 2/2013 | Anguelov et al. | 382/100 |
| 2003/0134665 A1* | 7/2003 | Kato et al. | 455/566 |
| 2005/0126023 A1* | 6/2005 | Kwon et al. | 33/356 |
| 2005/0194973 A1 | 9/2005 | Kwon et al. | |
| 2005/0231359 A1* | 10/2005 | Kampel et al. | 340/539.13 |
| 2006/0210169 A1* | 9/2006 | Colestock et al. | 382/218 |
| 2007/0150195 A1* | 6/2007 | Koskan et al. | 701/221 |
| 2007/0279248 A1* | 12/2007 | Matsumoto et al. | 340/825.72 |
| 2008/0226130 A1* | 9/2008 | Kansal et al. | 382/106 |
| 2009/0247183 A1* | 10/2009 | Fahrenthold | 455/456.1 |
| 2010/0188280 A1* | 7/2010 | Bunch et al. | 342/52 |
| 2011/0063167 A1* | 3/2011 | Gum et al. | 342/357.65 |
| 2011/0098056 A1* | 4/2011 | Rhoads et al. | 455/456.1 |
| 2011/0169947 A1* | 7/2011 | Gum et al. | 348/135 |
| 2011/0227788 A1* | 9/2011 | Lundgren et al. | 342/357.28 |

FOREIGN PATENT DOCUMENTS

| | | |
|---|---|---|
| JP | 2001311628 A | 11/2001 |
| JP | 2002044763 A | 2/2002 |
| JP | 2002358005 | 12/2002 |
| KR | 10-2003-0041659 | 5/2003 |
| KR | 10-2005-0009092 | 1/2005 |
| KR | 1020050063469 A | 6/2005 |

OTHER PUBLICATIONS

Written Opinion of International Searching Authority dated Dec. 23, 2011 in connection with International Patent Application No. PCT/KR2011/003967.
Translated Japanese Office Action dated Jan. 26, 2015 in connection with Japanese Patent Application No. 2013-513106; 13 pages.
Translated Chinese Office Action dated Mar. 26, 2015 in connection with Chinese Patent Application No. 201180026857.5; 12 pages.

* cited by examiner

+ : UNIT OF ZONE FOR DATA TRANSMISSION

APPARATUS AND METHOD FOR RECOGNIZING ZONE IN PORTABLE TERMINAL USING EARTH MAGNETIC FIELD COMPONENTS AND IMAGES

CROSS-REFERENCE TO RELATED APPLICATION(S) AND CLAIM OF PRIORITY

This application is related to and claims the benefit under 35 U.S.C. §119(a) of a Korean patent application filed in the Korean Intellectual Property Office on May 31, 2010 and assigned Serial No. 10-2010-0050847 and a Korean patent application filed in the Korean Intellectual Property Office on Feb. 11, 2011 and assigned Serial No. 10-2011-0012486, the entire disclosure of both of which are hereby incorporated by reference.

TECHNICAL FIELD OF THE INVENTION

The present invention relates to an apparatus and method for recognizing an indoor zone by using a magnetic field sensor in a portable terminal. More particularly, the present invention relates to an apparatus and method for recognizing an indoor zone in which a user is located by using an Earth's magnetic field that is generated naturally instead of the conventional method of combining a magnetic field generator and a magnetic field sensor.

BACKGROUND OF THE INVENTION

Portable terminals have become necessities of modern life for people of all ages. Thus, service providers and terminal manufacturers are competitively developing differentiated products and services.

For example, the portable terminal has developed into a multimedia device capable of providing various services such as phonebooks, games, Short Message Service (SMS), Electronic mail (E)-mail, morning calls, MPEG-1 Audio Layer 3 (MP3) player, scheduling, digital cameras, Multimedia Message Service (MMS), and wireless Internet.

Additionally, the aforementioned portable terminal provides a location information service which measures a location of the portable terminal, i.e., a location of a user, to inform the location. By using the location information service, the user can determine a user's current location, a bus stop around the current location, a path to a destination from the current location, and so forth. The location information service is one service frequently used by the user.

The location information service uses a Global Positioning System (GPS) in general. The GPS can obtain correct information in an outdoor zone where a satellite signal can be readily received, but cannot be used in an indoor zone where the satellite signal cannot be received.

In order to use the location information service in the indoor zone where the satellite signal cannot be received, a Wi-Fi Positioning System (WPS) technique that utilizes a Wi-Fi signal can be used. The WPS technique can be classified into a triangulation technique and a fingerprint technique. However, since Wireless Local Area Network (WLAN) signal strength is measured and used in both of the two techniques, at least 3 or more Access Points (APs) may be required to provide the location information service with high accuracy. Further, there is a problem in that AP information (e.g., Service Set IDentifier (SSID), Media Access Control (MAC) address, location, and the like) has to be managed in advance in a form of a database.

Instead of the aforementioned method, a sensor may be installed in a lattice form in an indoor zone (floor, ceiling, and the like), and thereafter a user location may be recognized by using a difference in a signal transfer rate between an ultrasonic signal and a signal generated from the sensor, or the user location can be recognized by utilizing a plurality of cameras, a pressure sensor, an infrared ray, and a Radio Frequency IDentification (RFID). However, this method may result in great expenses to install the sensor.

In addition, when using a method in which a magnetic field sensor is utilized to recognize the user location, a magnetic field generator is used to implement the method. Therefore, this method also has a problem in that the installation cost increases similarly to the case of using the sensor.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for recognizing an indoor zone by using a magnetic field sensor in a portable terminal.

Another aspect of the present invention is to provide an apparatus and method for recognizing an indoor zone by using an Earth's magnetic field that is generated naturally in a portable terminal instead of using a magnetic field generator.

Another aspect of the present invention is to provide an apparatus and method for correcting a value of a magnetic field sensor according to a posture of a portable terminal.

Another aspect of the present invention is to provide an apparatus and method for improving performance of a zone recognition technique by using an Earth's magnetic field that is generated naturally in a portable terminal.

Another aspect of the present invention is to provide an apparatus and method for improving performance of a zone recognition technique by using an image at a location at which an Earth' magnetic field component is collected in a portable terminal.

In accordance with an aspect of the present invention, an apparatus for recognizing a zone of a portable terminal is provided. The apparatus includes a zone evaluator for primarily recognizing a location of the portable terminal by using first and second components of an Earth's magnetic field and for finally recognizing the location of the portable terminal by using first and second images.

In accordance with another aspect of the present invention, a method of recognizing a zone of a portable terminal is provided. The method includes primarily recognizing a location of the portable terminal by using first and second components of an Earth's magnetic field, and finally recognizing the location of the portable terminal by using first and second images.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1A through 8B, discussed below, and the various embodiments used to describe the principles of the present disclosure in this patent document are by way of illustration only and should not be construed in any way to limit the scope of the disclosure.

The present invention described hereinafter relates to an apparatus and method for improving performance of a zone recognition technique by using a component of an Earth's magnetic field that is generated naturally in a portable terminal instead of a magnetic field generator. The component of the Earth's magnetic field that is generated naturally includes an Earth's magnetic field that is distorted by an indoor wall structure, arrangement of home appliances, a metal- or ore-contained product, and the like. The distorted Earth's magnetic field component changes negligibly over time and has a particular component depending on a location in an indoor zone, and such a property is used in location recognition in the indoor zone. Further, in addition to the Earth's magnetic field component, the present invention will improve zone recognition performance by comparing images at locations at which the Earth's magnetic field component is collected.

In the following description, a finger print is information corresponding to a location for zone recognition, and includes the Earth's magnetic field component including a horizontal intensity, a vertical intensity, an azimuth angle, and the like, which are determined by measuring the Earth's magnetic field. The finger print includes a reference finger print for a zone predetermined (or to be determined) by a user and a target finger print corresponding to a current location of the portable terminal. In addition, in the following description, a reference image is an image acquired by capturing a surrounding environment of a zone in which the reference finger print is determined, and a target image is an image acquired by capturing a surrounding environment of a zone in which the target finger print is determined.

Figure 1A:
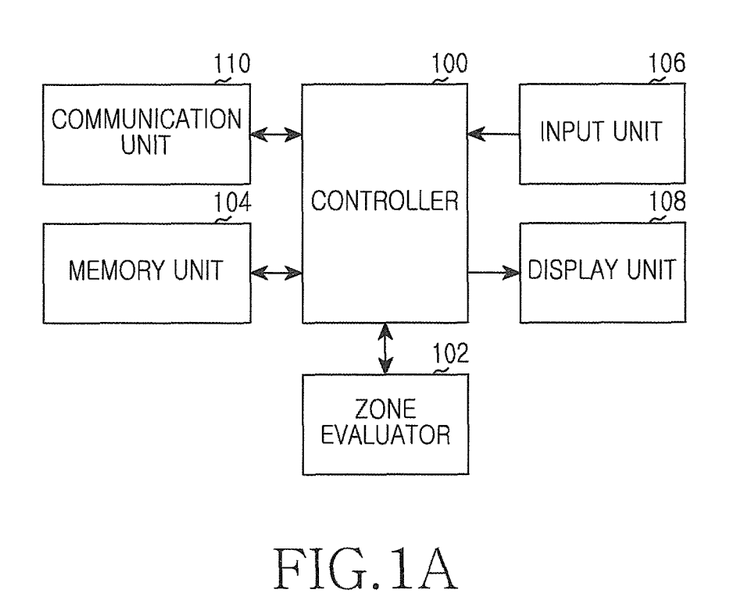
FIG. 1A illustrates a structure of a portable terminal for recognizing an indoor zone by using an Earth's magnetic field that is generated naturally according to an embodiment of the present invention.
Figure 1B:
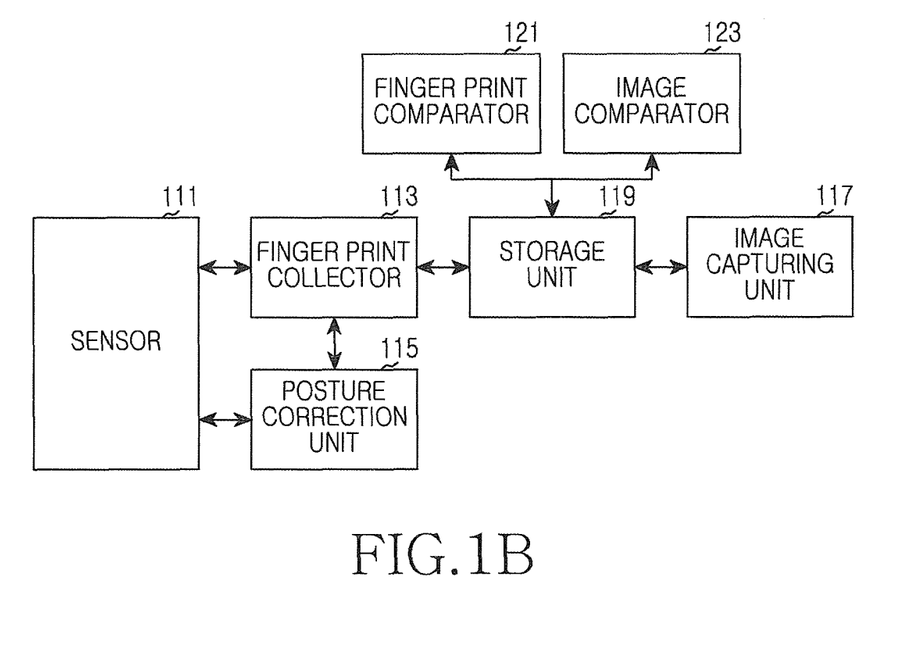
FIG. 1B illustrates a zone evaluator for recognizing an indoor zone by using an Earth's magnetic field that is generated naturally according to an embodiment of the present invention.

FIGS. 1A and 1B illustrate a structure of a portable terminal for recognizing an indoor zone according to an embodiment of the present invention.

FIG. 1A illustrates a structure of a portable terminal for recognizing an indoor zone by using an Earth's magnetic field that is generated naturally according to an embodiment of the present invention.

As shown in FIG. 1A, the portable terminal includes a controller 100, a zone evaluator 102, a memory unit 104, an input unit 106, a display unit 108, and a communication unit 110.

The controller 100 of the portable terminal provides overall control to the portable terminal. For example, the controller 100 processes and controls voice telephony and data communication, and other typical functions. Under the control of the controller 100, a reference finger print, which is an Earth's magnetic field component corresponding to a location to be determined as a reference zone, and a target finger print, which is an Earth's magnetic field component corresponding to a current location, are collected to recognize a current location in which the portable terminal is located. Herein, the finger print may include a horizontal intensity, a vertical intensity, an azimuth angle, and the like. The controller 100 may collect the finger print by measuring the Earth's magnetic field.

That is, the controller 100 determines a reference zone by collecting and storing the reference finger print for a zone to be determined as the reference zone by a user of the portable terminal, and thereafter persistently collects a finger print for the current location. By comparing the two finger prints, it is determined whether the zone in which the portable terminal is currently located corresponds to the reference finger print. If it is determined that the portable terminal is located in a specific location as a result of determining the current location, the portable terminal (more specifically, the controller 100) may perform a specific function (e.g., data transmission to a television set existing in the specific zone) in the specific zone.

Further, if the zone is recognized by comparing the reference finger print and the target finger print, the controller 100 determines the zone in which the portable terminal is currently located after comparing a reference image and a target image to improve a recognition rate. This is to solve a problem of the conventional zone recognition technique in which zone recognition cannot be performed correctly when the zone is recognized by using only the finger print since the same pattern of the Earth's magnetic field is detected in different zones.

Furthermore, when the portable terminal moves to the location determined as the reference zone, the controller 100 may execute a pre-registered interworking program so that the portable terminal may automatically interwork with a peripheral device in the reference zone.

The zone evaluator 102 collects the target finger print and the reference finger print which is information used to determine the current location of the portable terminal under the control of the controller 100. Herein, the finger print is information corresponding to a location for zone recognition, and includes a horizontal intensity, a vertical intensity, an azimuth angle, and the like, which are determined by measuring the Earth's magnetic field. The zone evaluator 102 uses the vertical intensity which is a component of an Earth's direction when recognizing the zone since the Z-axis out of the three axes (i.e., X, Y, and Z) clearly shows a value of the Earth's magnetic field distorted with respect to a building's floor, ceiling, and the like. For example, wherever the portable terminal is located in a 10-story building, a component Z is influenced by 11 thick concrete floor/ceiling constructions whereas components X and Y (i.e., horizontal components) are influenced by only a glass window and several pillars and walls.

Additionally, the zone evaluator 102 uses the horizontal intensity as a representative value for zone recognition. The horizontal intensity is obtained by removing a direction component from values of the X-axis and the Y-axis including the distorted Earth's magnetic field component weaker than that of the Z-axis of the portable terminal.

Further, the zone evaluator 102 obtains the azimuth angle by using the values of the X-axis and Y-axis which are horizontal components of the Earth's magnetic field of the portable terminal. Thereafter, since a directional change of the user can be determined by using the azimuth angle even at one fixed location, the azimuth angle that changes depending on the directional change of the user is used as a representative value for zone recognition. That is, the zone evaluator 102 uses the azimuth angle to determine the vertical intensity and the horizontal intensity which change depending on the directional change of the portable terminal according to the directional change of the portable terminal.

Furthermore, the zone evaluator 102 captures a surrounding environment of a location at which the reference finger print is collected and then stores the captured image by defining it as a reference image, and also captures a surrounding environment of a location at which the target finger print is collected and then stores the captured image by defining it as a target image. Thereafter, the zone evaluator 102 classifies a candidate zone by primarily comparing the finger prints and thereafter finally performs zone determination by comparing the reference image and the target image.

The memory unit 104 preferably includes, for example, a Read Only Memory (ROM), a Random Access Memory (RAM), a flash ROM, and such. The ROM stores a microcode of a program, by which the controller 100 and the zone evaluator 102 are processed and controlled, and a variety of reference data.

The RAM is a working memory of the controller 100 and stores temporary data that is generated while programs are performed. The flash ROM stores a variety of rewritable data, such as phonebook entries, outgoing messages, and incoming messages. The memory 104 stores the collected reference finger print and reference image according to the present invention.

The input unit 106 includes a plurality of function keys such as numeral key buttons of '0' to '9', a menu button, a cancel button, an OK button, a talk button, an end button, an Internet access button, a navigation key button, a character input key, and such. Key input data, which is input when the user presses these keys, is provided to the controller 100.

According to the present invention, the input unit 106 provides the controller 100 with a user input for determining the reference zone.

The display unit 108 displays information such as state information, which is generated while the portable terminal operates, numeric characters, moving and still pictures, and such. The display unit 108 may be a color Liquid Crystal Display (LCD), Active Mode Organic Light Emitting Diode (AMOLED), and such. The display unit 108 may include a touch input device as an input device when using a touch input type portable terminal.

The communication unit 110 transmits and receives a Radio Frequency (RF) signal of data that is input and output through an antenna (not illustrated). For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data.

FIG. 1B illustrates a zone evaluator for recognizing an indoor zone by using an Earth's magnetic field that is generated naturally according to an embodiment of the present invention.

Referring to FIG. 1B, the zone evaluator 102 includes a sensor 111, a finger print collector 113, a posture correction unit 115, an image capturing unit 117, a storage unit 119, a finger print comparator 121, and an image comparator 123.

The sensor 111 is a sensor for obtaining sensing information used to determine a current location of the portable terminal. The sensor 111 is a magnetic field sensor capable of measuring the Earth's magnetic field. The present invention is not limited to the magnetic field sensor for measuring the Earth's magnetic field. Thus, the sensor 111 may include a terrestrial magnetic sensor according to another embodiment of the present invention.

The finger print collector 113 of the zone evaluator 102 collects a horizontal intensity, a vertical intensity, an azimuth angle, and the like, of the portable terminal. The collected items are Earth's magnetic field components used to determine a zone in which the portable terminal is currently located. The Earth's magnetic field component can be defined as a finger print.

The finger print collector 113 collects a reference finger print which is a finger print for a zone (i.e., a reference zone) to be determined by a user of the portable terminal, and collects a target finger print which is a finger print for a current location of the portable terminal. Herein, the reference finger print and a current finger print are used to determine whether the current location of the portable terminal is the reference zone determined by the user. The finger print collector 113 may collect the target finger print if no movement of the portable terminal is detected for a specific time period according to the embodiment of the present invention.

Since the portable terminal cannot always remain in a posture parallel to an Earth's horizontal plane, the posture correction unit 115 corrects a value of the magnetic field sensor of the portable terminal according to angles of X' and Y' with respect to the earth horizontal plane as if the portable terminal remains parallel to the Earth's horizontal plane.

The image capturing unit 117 captures a surrounding environment of a location determined to the reference zone in order to correctly determine the zone in which the portable terminal is located, and captures a surrounding environment of a location at which the target finger print is collected. The image capturing unit 117 may include a camera module. The reference image is used as a reference for determining whether the portable terminal is located in the reference zone determined by the user.

The storage unit 119 stores the finger print collected by the finger print collector 113 and the reference image collected by the image capturing unit 117.

The finger print comparator 121 compares the target finger print and the reference finger print collected by the finger print collector 113, and primarily determines whether the current location of the portable terminal is the reference zone determined by the user.

For example, if a comparison value of the reference finger print and the target finger print is within a specific range, the finger print comparator 121 may determine that there is a possibility that the two finger prints have the same zone.

The image comparator 123 finally evaluates a zone determination result of the finger print comparator 121. The reference image is compared with the target image to determine whether the primary determination result is correct.

The image comparator 123 may compare the target image with a comparative image by using such an algorithm as Mean, Variance, Mean Squared Error, Peak Signal to Noise Ratio, Average Difference, Normalized Cross-Correlation, Maximum Difference, Laplacian Mean Squared Error, Normalized Absolute Error, Picture Quality Scale, and the like.

Although one or more functions of the zone evaluator 102 can be performed by the controller 100, they are separately constructed in the present invention for exemplary purposes only. Thus, those ordinary skilled in the art can understand that various modifications can be made within the scope of the present invention. For example, functions of the zone evaluator 102 and the controller 100 can be both processed by the controller 100.

Figure 2:
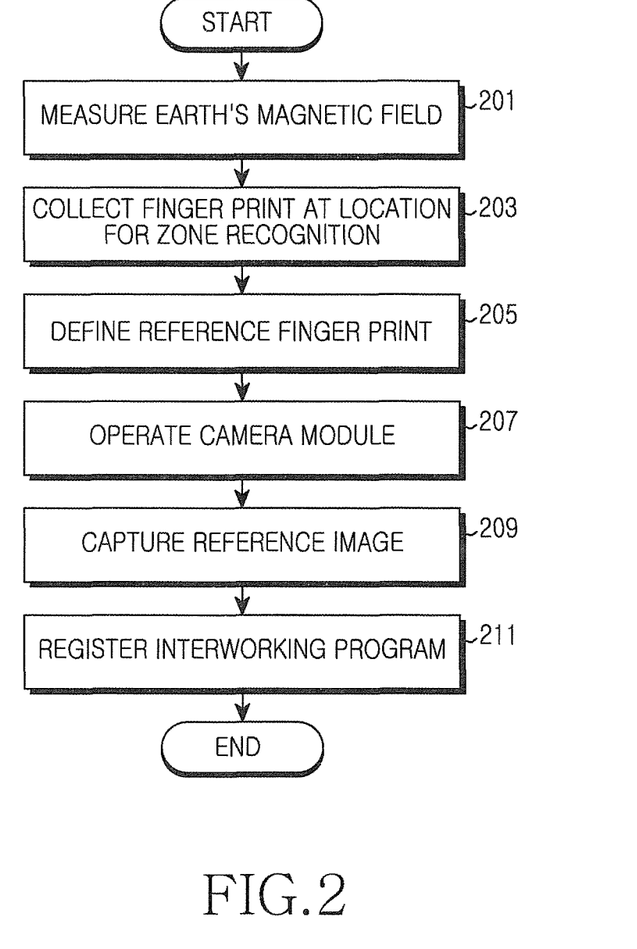
FIG. 2 illustrates a process for collecting reference information used for zone recognition determination in a portable terminal according to an embodiment of the present invention.

FIG. 2 illustrates a process for collecting reference information used for zone recognition determination in a portable terminal according to an embodiment of the present invention.

Referring to FIG. 2, the portable terminal measures an Earth's magnetic field in step 201, and collects a finger print for zone recognition in step 203. Herein, the finger print includes a horizontal intensity, a vertical intensity, an azimuth angle, and the like, of an Earth's magnetic field component corresponding to a location for zone recognition. This will be described below in detail with reference to FIG. 4.

In step 205, the portable terminal defines the finger print collected in step 203 as a reference finger print. Herein, the reference finger print is the Earth's magnetic field component for a zone to be registered by the user, and is used to determine whether the current location of the portable terminal is the location for zone recognition.

Thereafter, the portable terminal operates a camera module in step 207, and captures a reference image in step 209. Herein, the reference image is an image acquired by capturing a surrounding environment of a zone in which the reference finger print is determined (i.e., a reference zone determined by the user). The portable terminal may capture an image of a ceiling or wall with respect to a current location according to a location of the camera module included in the portable terminal.

In step 211, the portable terminal registers an interworking program that is automatically executed when the portable terminal is located in the reference zone determined by the user. Thereafter, the procedure of FIG. 2 ends. The reference image and the reference finger print may be defined as the aforementioned reference information.

Figure 3:
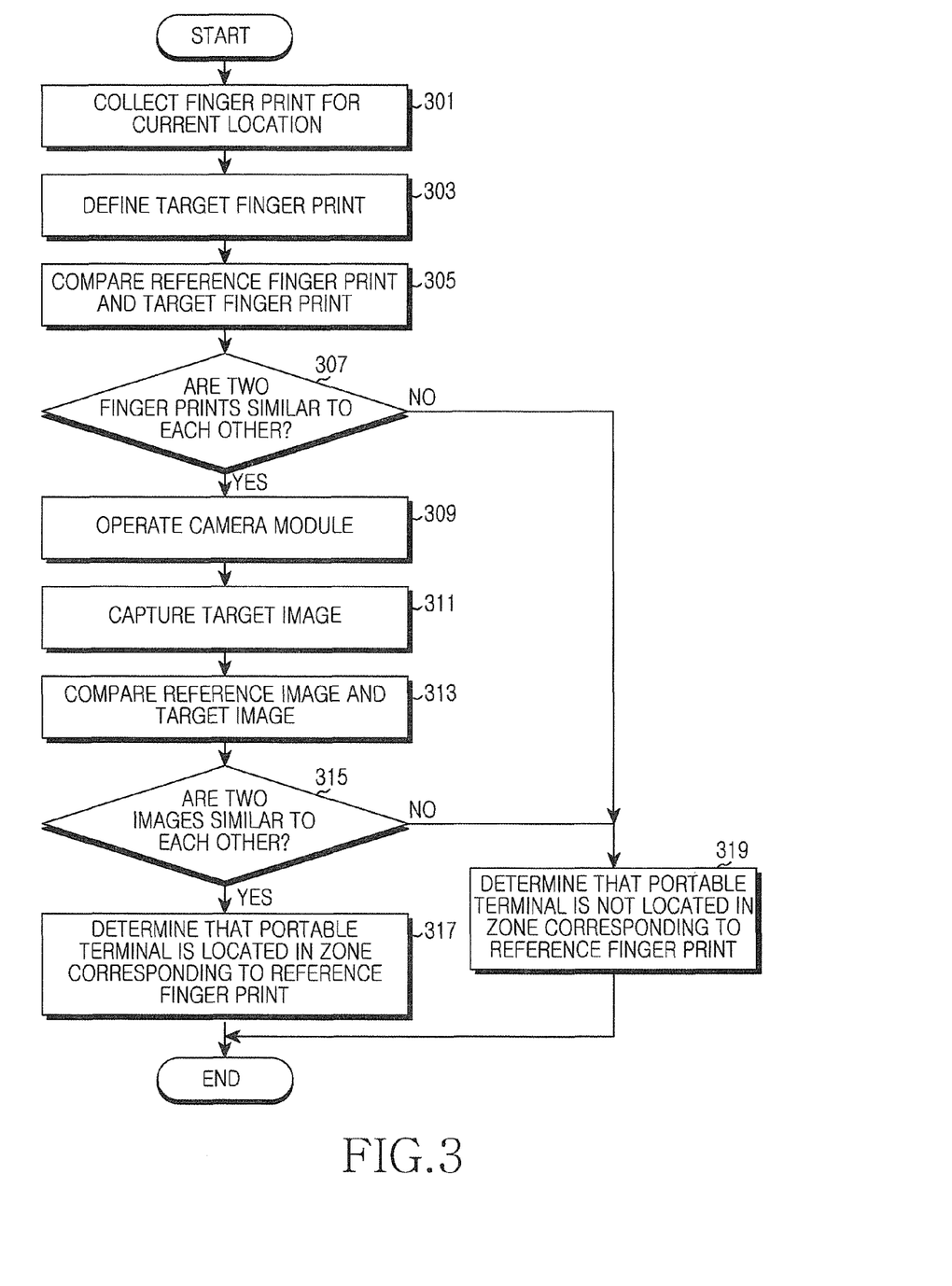
FIG. 3 illustrates a zone recognition process for a portable terminal according to an embodiment of the present invention.

FIG. 3 is a flowchart illustrating a zone recognition process for a portable terminal according to an embodiment of the present invention.

Referring to FIG. 3, the portable terminal collects a finger print for a current location in step 301, and proceeding to step 303, defines the finger print collected in step 301 as a target finger print. The portable terminal may collect the target finger print at a moment when the portable terminal is located at a particular location or may collect the target finger print periodically in order to determine a location of a user who is on the move. The moment when the portable terminal is located at the particular location is a moment when the portable terminal is placed down to the particular location and thus no movement is made. The portable terminal may determine a collection time point of the target finger print by utilizing a gravity acceleration sensor.

In step 305, the portable terminal performs a process for comparing the reference finger print and the target finger print in order to determine whether the portable terminal is located in a zone registered by the user, and thereafter proceeding to step 307, determines the comparison result of step 305. The portable terminal may pre-store the reference finger print and then compare it with the collected target finger print. Alternatively, according to another embodiment, the portable terminal may transmit the two collected finger prints to a specific server so that the specific server may compare the two finger prints.

That is, by comparing the two finger prints, the portable terminal determines whether a current zone is the zone registered by the user. For example, the portable terminal may obtain a distribution for each of a horizontal intensity, a vertical intensity, and an azimuth angle corresponding to the finger print, and then compare the distribution for each element between the finger prints to determine the zone according to a similarity of the two finger prints. In another embodiment, the portable terminal may obtain an average, a minimum value, a maximum value, a standard deviation, and the like, for each of the horizontal intensity, the vertical intensity, and the azimuth angle, and then compare the average, the minimum value, the maximum value, the standard deviation, and the like, for each data element between the two finger prints to determine the zone according to the similarity of the two finger prints. The portable terminal may compare all elements or some elements of the finger prints, and may differently determine a weight for each element.

The portable terminal may use the following methods in order to decrease a computational amount used to determine the zone registered by the user.

1) A method of decreasing a computational amount by decreasing the number of steps of the process for comparing the reference finger print and the target finger print.

First, the portable terminal may determine secondary location information when the reference finger print is registered in order to avoid the increase of the computational amount resulted from the unnecessary comparison between the reference print and the target print. Herein, the secondary location information may include a cell IDentifier (ID), a Wi-Fi Service Set ID (SSID), a Global Positioning System (GPS) coordination, and the like. The portable terminal may classify the target finger print corresponding to the zone registered by using the secondary location information and thus may perform the process for comparing the target finger print and the reference finger print. (Herein, the cell ID and the Wi-Fi SSID use information having the strongest signal strength.)

2) A method of decreasing a computational amount by decreasing the number of steps of the process for collecting the target finger print.

As described above, the portable terminal may determine the secondary location information when the reference finger print is registered and thereafter may collect the target finger print for a specific zone when the portable terminal is located in a zone registered by using the secondary location information.

This method is for decreasing the steps of a computational operation of the portable terminal. The aforementioned two methods may be performed independently, or may be performed in a combined manner.

If it is determined in step 307 that information on the reference finger print is not similar to information on the target finger print, processing to step 319, the portable terminal determines that the portable terminal is not located in the zone corresponding to the reference finger print.

Otherwise, if it is determined in step 307 that the information on the reference finger print is similar to the information on the target finger print, it is primarily determined that the portable terminal is located in the zone corresponding to the reference finger print. If it is determined that there is a plurality of reference finger prints similar to the target finger print, then the portable terminal creates a list of candidate reference finger prints.

The candidate reference finger print is generated because the same pattern of the Earth's magnetic field is detected in different zones. Due to such a phenomenon, correct zone recognition becomes difficult in the portable terminal. Therefore, the portable terminal of the present invention additionally performs a process for determining whether the primary zone determination is correct.

In order to determine whether the primary zone determination is correct, the portable terminal operates a camera module in step 309, and captures a surrounding environment at a current location in step 311. That is, the portable terminal captures the surrounding environment where the target finger print is collected as an Earth's magnetic field component for the current location, and defines the captured image as a target image.

In step 313, the portable terminal compares a pre-stored reference image (i.e., an image corresponding to a reference zone) and a target image which is a surrounding environment image of the current location. In step 315, the portable terminal determines the comparison result of step 313.

If it is determined in step 315 that the reference image is not similar to the target image, proceeding to step 319, the portable terminal determines that the portable terminal is not located in the zone corresponding to the reference finger print.

Otherwise, if it is determined in step 315 that the reference image is similar to the target image, proceeding to step 317, the portable terminal determines that the portable terminal is located in the zone corresponding to the reference finger print. If the portable terminal determines that there is a plurality of reference finger prints similar to the target finger print, the portable terminal may determine a reference image similar to the target image among reference images corresponding to the plurality of reference finger prints and then may determine that the portable terminal is located in a zone corresponding to the reference image.

When it is determined that the portable terminal is located in the zone corresponding to the reference finger print, the portable terminal may automatically interwork with a device located in the reference zone by executing a pre-registered interworking program.

Thereafter, the procedure of FIG. 3 ends.

Figure 4:
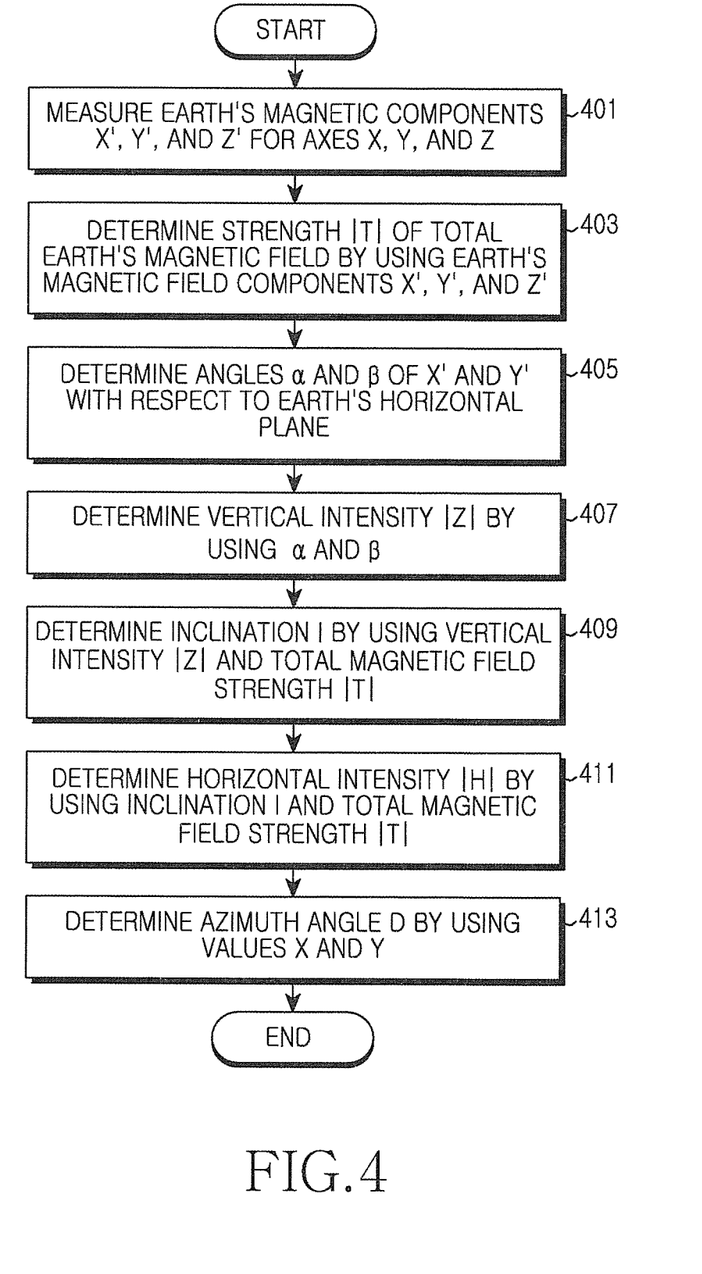
FIG. 4 illustrates a process for collecting a finger print for an Earth's magnetic field in a portable terminal according to an embodiment of the present invention.

FIG. 4 illustrates a process for collecting a finger print for an Earth's magnetic field in a portable terminal according to an embodiment of the present invention.

Referring to FIG. 4, the portable terminal measures Earth's magnetic components X', Y', and Z' corresponding to respective axes X, Y, and Z of the portable terminal in step 401.

Herein, the X-axis of the portable terminal represents a direction in which a screen width is short in a plane parallel to a screen of the portable terminal, the Y-axis represents a direction in which the screen width is long in the plane parallel to the screen of the portable terminal, and the Z-axis represents a direction vertical to the screen. An Earth's magnetic field component is a vector value consisting of a strength and a direction. The strength of the Earth's magnetic field component corresponding to the X-axis is expressed by |X'|, and the direction thereof is expressed by a unit vector of a direction in which the screen width is short in the plane parallel to the screen.

In step 403, the portable terminal determines a strength |T| of the total Earth's magnetic field by using the Earth's magnetic field components X', Y', and Z' measured in step 301 and Equation (1) below.

$$|T|=((X')^2+(Y')^2+(Z')^2)^{0.5} \qquad \text{[Eqn. 1]}$$

In step 405, the portable terminal determines angles α and β of X' and Y' with respect to an Earth's horizontal plane by using Equation (2) below. Herein, since the portable terminal cannot always be in a posture that is parallel to the Earth's horizontal plane, a correction process is performed so that the portable terminal remains in the posture as if it remains parallel to the Earth's horizontal plane. In the correction process, the portable terminal corrects a value of the magnetic field sensor of the portable terminal according to the angles of X' and Y' with respect to the Earth's horizontal plane.

$$\alpha=\sin^{-1}(|X_{a'}|/g0)$$

$$\beta=\sin^{-1}(Y_{a'}/g0) \qquad \text{[Eqn. 2]}$$

In Equation (2), α denotes an angle of the vector X' deviated from the Earth's horizontal plane, and β denotes an angle of the vector Y' deviated from the Earth's horizontal plane. $X_{a'}$ denotes a gravity acceleration component of a direction in which a screen width is short in a plane parallel to a screen, and $Y_{a'}$ denotes a gravity acceleration component of a direction in which the screen width is long in the plane parallel to the screen. In addition, g0 denotes an average gravity acceleration and is a constant having a value of 9.80665 m/s² (~32.174 ft/s²).

In step 407, the portable terminal determines a vertical intensity |Z| by using the angles of X' and Y' determined in step 405 with respect to the horizontal plane.

Herein, if the portable terminal is tilted against the Earth's horizontal plane, the portable terminal may determine the vertical intensity as a component of a magnetic north direction from the Earth's magnetic field components X', Y', and Z' according to Equation (3) below by utilizing the tilted angle. If the portable terminal is parallel to the Earth's horizontal plane, the tilted angle is '0'. Therefore, by substituting this angle to Equation (3) below, the vertical intensity |Z| can be determined for the horizontal posture.

$$|Z|=|\sin \alpha \cdot X'+\sin \beta \cdot Y'+\cos \alpha \cdot \cos \beta \cdot Z'| \qquad \text{[Eqn. 3]}$$

In step 409, the portable terminal determines an inclination I used to determine a horizontal intensity |H| of the portable terminal by using the vertical intensity |Z| and the total Earth's magnetic field strength |T| according to Equation (4) below.

$$I=\sin^{-1}(|Z|/|T|) \qquad \text{[Eqn.4]}$$

In step 411, the portable terminal determines the horizontal intensity |H| of the portable terminal by using the inclination determined in step 409 and the total Earth's magnetic field strength according to Equation (5) below. In step 413, the portable terminal determines an azimuth angle D of the portable terminal. The portable terminal may determine the azimuth angle of the portable terminal by using the direction sensor, or may determine the azimuth angle by substituting the Earth's magnetic field components X' and Y' to Equation (6) below. Herein, the Earth's magnetic field component corresponds to a direction of the portable terminal with respect to a plane parallel to the screen of the portable terminal.

$$|H|=|T|*\cos(I) \qquad \text{[Eqn. 5]}$$

$$\Phi = \tan^{-1}\left(\frac{\cos\beta \cdot Y' + \sin\beta \cdot \cos\alpha \cdot Z'}{\cos\alpha \cdot X' + \sin\alpha \cdot \cos\beta \cdot Z'}\right) \qquad \text{[Eqn. 6]}$$

$$D = \begin{cases} \Phi & (X' \geq 0) \\ 180° + \Phi & (X' < 0) \end{cases}$$

The portable terminal determines the vertical intensity |Z| determined in step 407, the horizontal intensity |H| determined in step 411, and the portable terminal's azimuth angle D determined in step 413 whenever the Earth's magnetic field is measured, and defines them as a finger print collected by the portable terminal. The finger print is the Earth's magnetic field component corresponding to a location of the portable terminal located in an indoor zone, and is used for both collecting the reference finger print and the target finger print.

Since the Z-axis out of the three axes (i.e., X, Y, and Z) clearly shows a value of the Earth's magnetic field distorted with respect to a building's floor, ceiling, and the like, when recognizing the zone, the portable terminal uses the vertical intensity which is a component of an Earth's direction, and uses the horizontal intensity obtained by removing a direction component from values of the X-axis and the Y-axis including a distorted Earth's magnetic field component weaker than that of the Z-axis of the portable terminal.

Further, the portable terminal obtains the azimuth angle by using the values of the X-axis and Y-axis which are horizontal components of the Earth's magnetic field of the portable terminal to determine a directional change of the user. Therefore, the azimuth angle that changes depending on the directional change of the user is used even at one fixed location.

Thereafter, the procedure of FIG. 4 ends.

Figure 5:
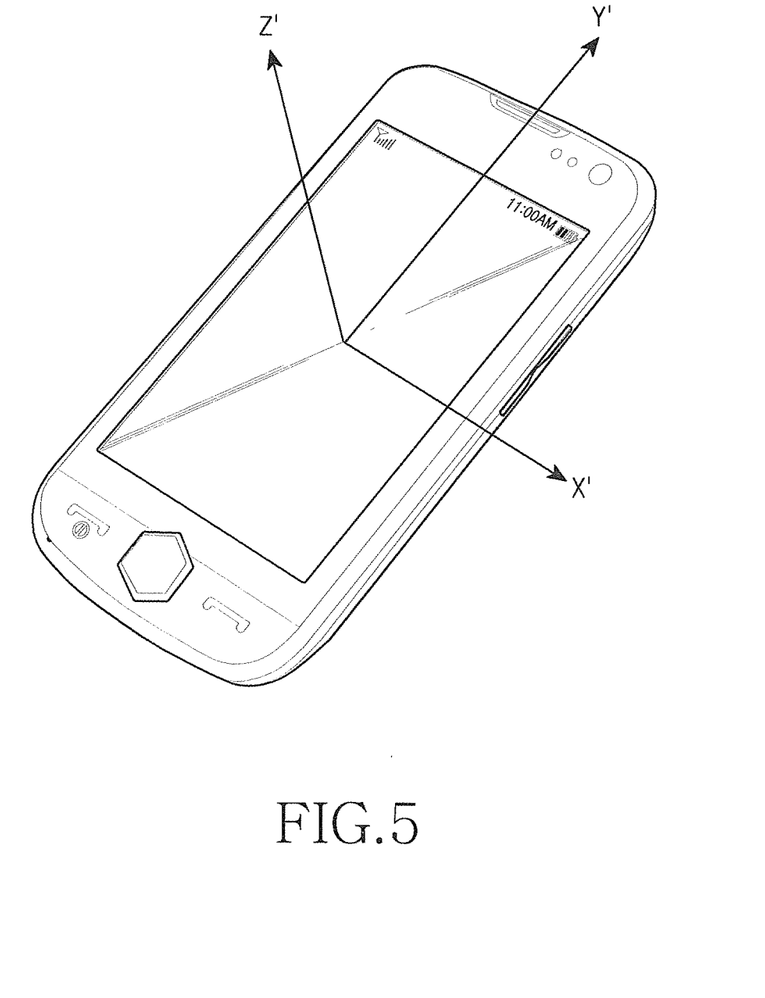
FIG. 5 illustrates Earth's magnetic field components corresponding to respective axes of a portable terminal according to an embodiment of the present invention.

FIG. 5 illustrates Earth's magnetic field components corresponding to respective axes of a portable terminal according to an embodiment of the present invention.

Referring to FIG. 5, if the X-axis represents a direction in which a screen width is short in a plane parallel to a screen of the portable terminal, the Y-axis represents a direction in which the screen width is long in the plane parallel to the screen of the portable terminal, and the Z-axis represents a direction vertical to the screen, then Earth's magnetic field components corresponding to the respective axes X, Y, and Z of the portable terminal are denoted by X', Y', and Z'.

The Earth's magnetic field component is a vector value consisting of a strength and a direction. The strength of the Earth's magnetic field component corresponding to the X-axis is expressed by |X'|, and the direction thereof is expressed by a unit vector of a direction in which the screen width is short in the plane parallel to the screen. In addition, the strength of the Earth's magnetic field corresponding to the Y-axis is expressed by |Y'|, and the direction thereof is expressed by a unit vector of a direction in which the screen width is long in the plane parallel to the screen.

Figure 6A:
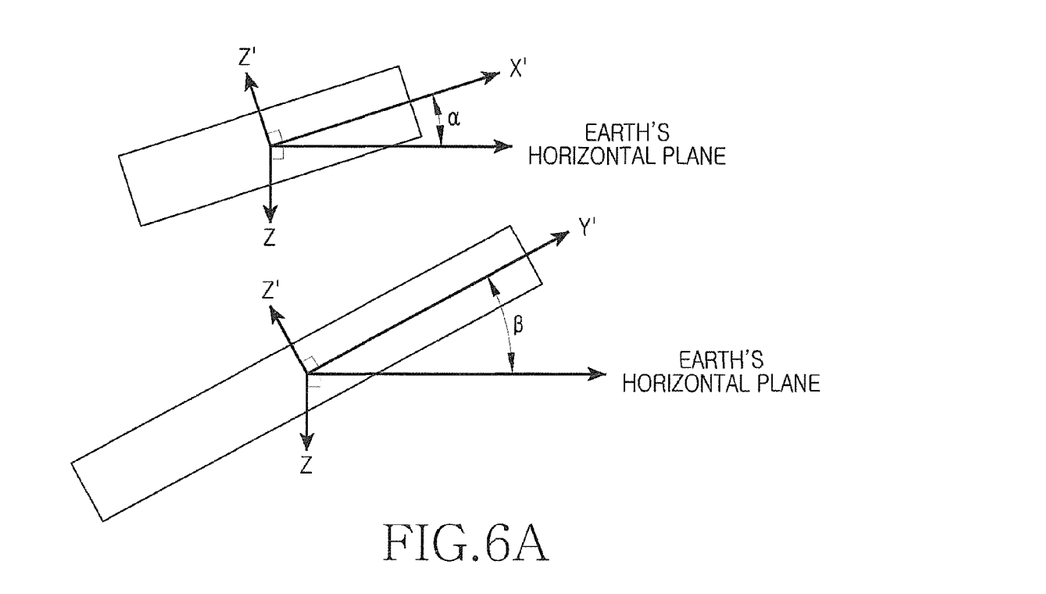
FIGS. 6A and 6B illustrate a state in which a portable terminal is tilted against an Earth's horizontal plane according to an embodiment of the present invention.
Figure 6B:
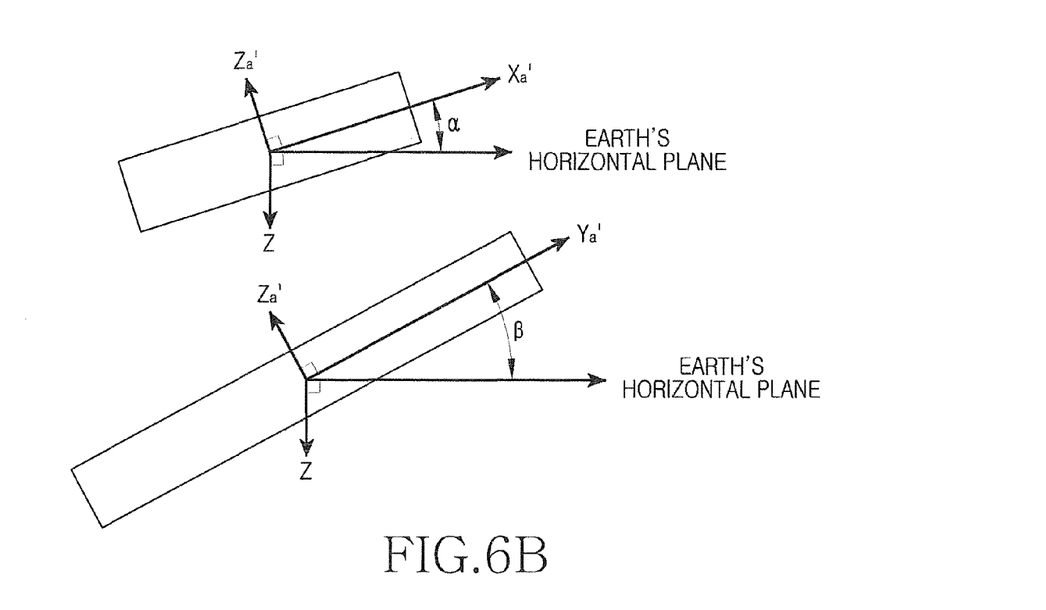

FIGS. 6A and 6B illustrate a state in which a portable terminal is tilted against an Earth's horizontal plane according to an embodiment of the present invention.

Referring to FIGS. 6A and 6B, the portable terminal is a terminal that can be easily carried, and cannot always remain parallel to the Earth's horizontal plane.

Referring to FIG. 6A, Earth's magnetic field components X', Y', and Z' corresponding to the respective axes X, Y, and Z of the portable terminal are tilted against the Earth's horizontal plane. Herein, $\alpha$ denotes an angle of the Earth's magnetic field component corresponding to the X-axis of the portable terminal (i.e., the vector X') deviated from the Earth's horizontal plane, and $\beta$ denotes an angle of the Earth's magnetic field component corresponding to the Y-axis of the portable terminal (i.e., the vector Y') deviated from the Earth's horizontal plane.

Since the portable terminal cannot collect a correct finger print (i.e., a vertical intensity |Z|, a horizontal intensity |H|), and an azimuth angle D of the portable terminal) for evaluating an indoor zone in a state where the portable terminal is tilted against the Earth's horizontal plane, the portable terminal measures $X_{a"}$ (i.e., a gravity acceleration component of a direction in which a screen width is short in a plane parallel to the screen) and $Y_{a"}$ (i.e., a gravity acceleration component of a direction in which the screen width is long in the plane parallel to the screen) by utilizing a gravity acceleration sensor as illustrated in FIG. 6B. Then, by using the measured values, the portable terminal corrects the values according to a posture of the portable terminal when measuring the Earth's magnetic field as described in step 405 of FIG. 4.

Figure 7:
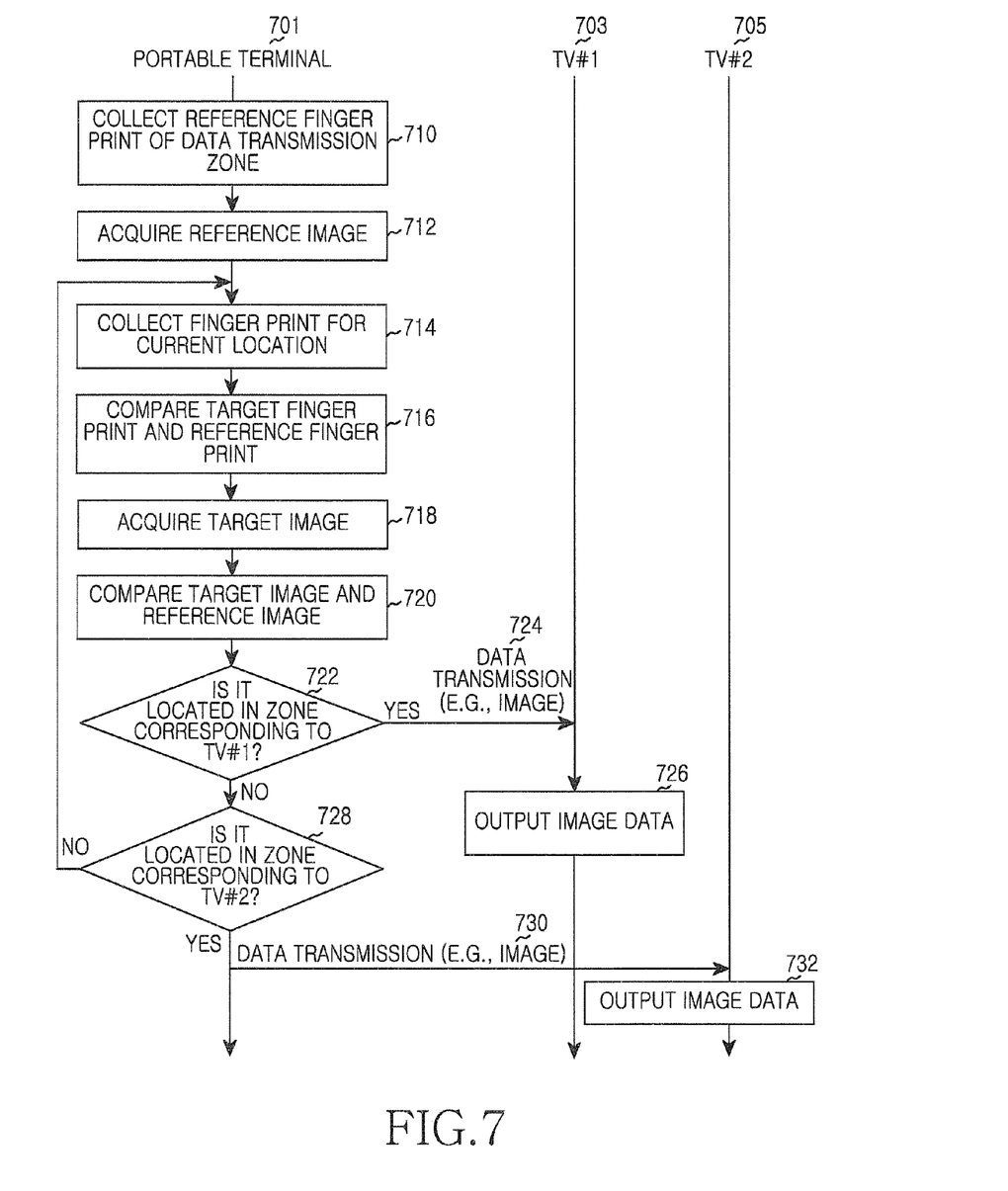
FIG. 7 illustrates a process for controlling a peripheral device by recognizing an indoor zone in a portable terminal according to an embodiment of the present invention.

FIG. 7 illustrates a process for controlling a peripheral device by recognizing an indoor zone in a portable terminal according to an embodiment of the present invention.

Referring to FIG. 7, a portable terminal 701 may communicate with a first television (TV) set 703 and a second TV set 705. Further, the portable terminal 701 may determine a zone capable of communicating with the TV sets 703 and 705 and thus may automatically communicate with the TV sets 703 and 705.

The portable terminal 701 collects a reference finger print for the zone for communicating with the TV sets 703 and 705 (step 710).

Herein, the reference finger print is information for specifying the zone for data transmission, and is an Earth's magnetic field component such as vertical intensity |Z|, horizontal intensity |H|, and an azimuth angle D of the portable terminal 701.

Upon collecting the reference finger print, the portable terminal 701 may acquire an image for a reference zone (step 712), store the acquired image, and then determine a reference zone for the first TV set 703. Although only a process in which the portable terminal 701 determines the reference zone for the first TV set 703 is shown herein in order to show a process for determining the reference zone capable of communicating with the TV set, the portable terminal 701 may also predetermine a zone capable of communicating with the second TV set 705.

When the reference zone is determined as described above, for zone recognition, the portable terminal 701 may collect a target finger print which is a finger print at a current location (step 714), compare it with the reference finger print (step 716), and determine a location of the portable terminal 701.

That is, the portable terminal 701 determines whether the two finger prints are similar to each other by collecting the target finger print which is the finger print for the current location (step 714) and then by comparing the collected target finger print and the pre-stored reference finger print (step 716).

If the reference finger print and the target finger print are similar to each other, the portable terminal 701 may determine that there is a possibility that the current zone is the zone capable of communicating with the TV set.

Thereafter, to improve a zone recognition rate, the portable terminal 701 of the present invention acquires a target image that captures a surrounding environment of a location at which the target finger print is obtained (step 718), and compares the acquired image and a pre-stored reference image (step 720). Accordingly, the portable terminal 701 determines a zone in which the portable terminal is located.

This is to avoid a problem in which correct zone recognition becomes difficult since a plurality of candidate finger prints are generated when the same pattern of the Earth's magnetic field is detected in different zones.

After comparing the reference image and the target image, the portable terminal determines whether it is located in a zone for the first TV set 703 (step 722). If it is determined that the portable terminal 701 is located in the first TV set 703 (i.e., if the reference image is similar to the target image in a first zone), the portable terminal 701 transmits data to the first TV set 703 (step 724). For example, the portable terminal 701 may execute an interworking program which is registered to be executed in the first TV set 703 while being located in the first TV set 703, and thereafter may perform data transmission. Upon receiving the data, the first TV set 703 outputs the received data (step 726).

If it is determined that the portable terminal 701 is not located in the first TV set 703 as a result of comparing the reference image and the target image, the portable terminal 701 determines whether it is located in a zone for the second TV set 705 (step 728).

If the portable terminal 701 is not located in the zone for the first TV set 703 and the zone for the second TV set 705, the process for collecting the target finger print is performed again.

Otherwise, if it is determined that the portable terminal 701 is located in a zone capable of communicating with the second TV set 705, the portable terminal transmits data to the second TV set 705 (step 730), and the second TV set 705 outputs the received data (step 732). Accordingly, a user of the portable terminal 701 may persistently evaluate the data, which is output to the first TV set 703 depending on the movement made in an indoor zone, from the second TV set 705. The portable terminal 701 may execute an interworking application for transmitting data to the second TV set 705 while being located in the zone for the second TV set 705, and thereafter may perform data transmission.

Figure 8A:
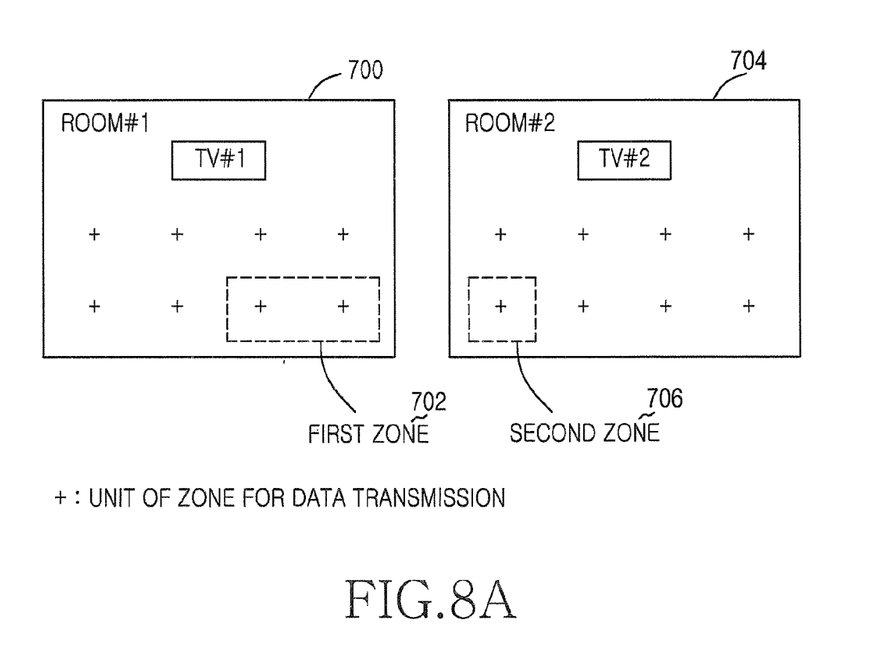
FIGS. 8A and 8B illustrate a zone capable of data transmission and determined in a portable terminal according to an embodiment of the present invention.
Figure 8B:
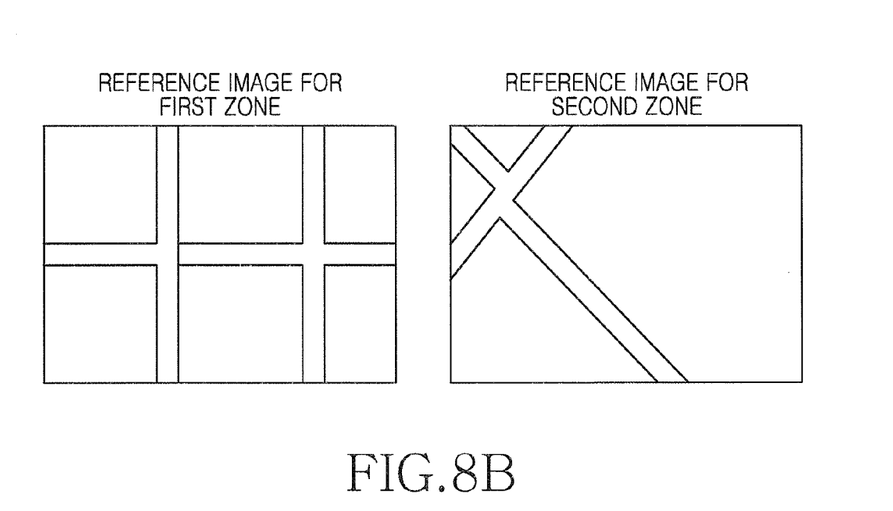

FIGS. 8A and 8B illustrate a zone capable of data transmission and determined in a portable terminal according to an embodiment of the present invention.

Referring to FIGS. 8A and 8B, the portable terminal determines a zone capable of data transmission as a reference zone (i.e., a first zone 702 and a second zone 706) by collecting a reference finger print for a specific zone of a first room 700 and a second room 704. A reference image is stored in the portable terminal as an image that captures each zone as illustrated in FIG. 8B.

A TV set #1 and a TV set #2 are present for the respective rooms, i.e., the first room 700 and the second room 704. The TV sets may automatically establish a communication connection with the portable terminal located in a predetermined zone.

For example, if a user of the portable terminal intends to determine the first zone 702 enabling an automatic connection to the first TV set in the first room 700, the user of the portable terminal is located in the first zone 702 and collects a finger print for the first zone. The finger print for the first zone 702 becomes a reference finger print, and the collected reference finger print is stored in order to be compared with a target finger print. In addition, the portable terminal captures a surrounding environment of a zone in which the reference finger print is collected, and registers the captured image as a reference image.

In addition, in order to determine the second zone 706 enabling an automatic connection with the second TV set in the second room 704, the portable terminal registers a finger print and reference image for the second zone.

After determining the reference zone for each room by collecting the reference finger print and the reference image, the portable terminal persistently collects the target finger print or if there is no movement of the portable terminal, collects the target finger print. That is, the portable terminal collects the target finger print for a zone (or location) to which the user of the portable terminal moves, in order to recognize a current location of the portable terminal. The current location of the portable terminal can be recognized by comparing the collected target finger print and the reference finger print as described above.

The finger print is information capable of identifying the indoor zone, and is an Earth's magnetic field component such as a vertical intensity |Z|, a horizontal intensity |H|, and an azimuth angle D of the portable terminal. Accordingly, by comparing the reference finger print obtained in the first zone 702 and the target finger print corresponding to the current location of the portable terminal, the portable terminal can determine the current location and the predetermined reference zone even if the user moves to anywhere in the indoor zone.

However, if the zone is determined by using only the finger print which is the Earth's magnetic field component, a finger print similar to the reference finger print for the first room can be collected in the second room. That is, although the portable terminal is located in the second room, it can be determined that the portable terminal is located in the first room by using a similar finger print.

In order to solve such a problem, the portable terminal can determine whether the finger print is for a finger print for the first room or a finger print for the second room by using a surrounding environment image at a location where the finger print is collected.

Accordingly, the portable terminal compares the target finger print and the reference finger print. If it is determined that the two finger prints are similar to each other, the portable terminal acquires a surrounding environment image of a current location and compares the acquired image and a pre-stored reference image.

If it is determined that a reference image of the first zone is the same as the acquired target image, it is determined that the portable terminal is located in the first zone and thus data is transmitted to the first TV set.

Thereafter, if the user of the portable terminal moves to the second room 704 while watching data stored in the portable terminal by using the first TV set and thus the portable terminal is located in the second zone 706, the portable terminal compares the persistently collected target finger print and the reference finger print corresponding to the second room 704.

If it is determined that the portable terminal is located within the second zone 706 as a result of comparing the two finger prints, the portable terminal compares a target image and a reference image for the second zone.

If the reference image is the same as the target image, it is determined that the portable terminal is located in the second zone, and photo/video currently being watched are transmitted to the second TV set, so that data stored in the portable terminal can be persistently watched through the second TV set.

Otherwise, if the reference image is not the same as the target image, it can be determined that the portable terminal is not located in the reference zone.

According to exemplary embodiments of the present invention, an apparatus and method for determining a zone of a portable terminal located in an indoor zone are provided. Since an Earth's magnetic field that is generated naturally is measured to determine the indoor zone instead of using a magnetic field generator, an installation cost of a device for recognizing the indoor zone can be decreased.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A portable terminal comprising:
a memory unit configured to store an Earth's magnetic field component corresponding to a predetermined zone for controlling a function of the portable terminal, and information of function to be executed at the predetermined zone; and
a controller coupled to the memory unit, the controller configured to:
control a sensor to acquire an Earth's magnetic field component corresponding to a current location of the portable terminal,
determine whether the portable terminal is located within the predetermined zone by comparing the acquired Earth's magnetic field component and the stored Earth's magnetic field component, and
if the portable terminal is located within the predetermined zone, execute a function corresponding to the predetermined zone in which the portable terminal is located.

2. The apparatus of claim 1, wherein the portable terminal comprises:
an image acquisition unit to acquire an image corresponding to the predetermined zone in which the portable terminal is located; and
if determined that the portable terminal is located within the predetermined zone using the Earth's magnetic field, the controller is configured to determine whether the portable terminal is located within the predetermined zone by comparing the acquired image and prestored image of the predetermined zone predetermined zone corresponding to the current location of the portable terminal.

3. The apparatus of claim 2, wherein the controller is further configured to acquire the Earth's magnetic field component by correcting a horizontal part of the portable terminal with respect to an Earth's horizontal plane.

4. The apparatus of claim 1, wherein the Earth's magnetic field component is information corresponding to a location for zone recognition and include at least one of a horizontal intensity |H|, a vertical intensity |Z|, and an azimuth angle D which are determined by measuring the Earth's magnetic field.

5. The apparatus of claim 4, wherein the Earth's magnetic field component corresponds to the Earth's magnetic field that is distorted by an indoor wall structure, arrangement of home appliances, and a metal- or ore-contained product, and changes negligibly over time and has a particular property depending on a location in an indoor zone, and the particular property is used in location recognition in the indoor zone.

6. A method of recognizing a zone of a portable terminal, the method comprising:
storing an Earth's magnetic field component corresponding to a predetermined zone for controlling a function of the portable terminal, and information of function to be executed at the predetermined zone;
acquiring an Earth's magnetic field component corresponding to a current location of the portable terminal;
determining whether the portable terminal is located within the predetermined zone by comparing the acquired Earth's magnetic field component and the stored Earth's magnetic field component; and
if the portable terminal is located within the predetermined zone, executing a function corresponding to the predetermined zone specific location in which the portable terminal is located.

7. The method of claim 6, further comprising:
acquiring an image corresponding to the predetermined zone in which the portable terminal is located;
if determined that the portable terminal is located within the predetermined zone using the Earth's magnetic field, determining whether the portable terminal is located within the predetermined zone by comparing the acquired image and prestored image of the predetermined zone corresponding to the current location of the portable terminal.

8. The method of claim 7, wherein the acquiring an image corresponding to the specific location in which the portable terminal is located is a process for obtaining the Earth's magnetic field component by correcting a horizontal part of the portable terminal with respect to an Earth's horizontal plane.

9. The method of claim 8, wherein the Earth's magnetic field component is information corresponding to a location for zone recognition and includes at least one of a horizontal intensity |H|, a vertical intensity |Z|, and an azimuth angle D which are determined by measuring the Earth's magnetic field.

10. The method of claim 9, wherein the Earth's magnetic field component corresponds to the Earth's magnetic field that is distorted by an indoor wall structure, arrangement of home appliances, and a metal- or ore-contained product, and changes negligibly over time and has a particular property depending on a location in an indoor zone, and the particular property is used in location recognition in the indoor zone.

* * * * *